Figure 1:
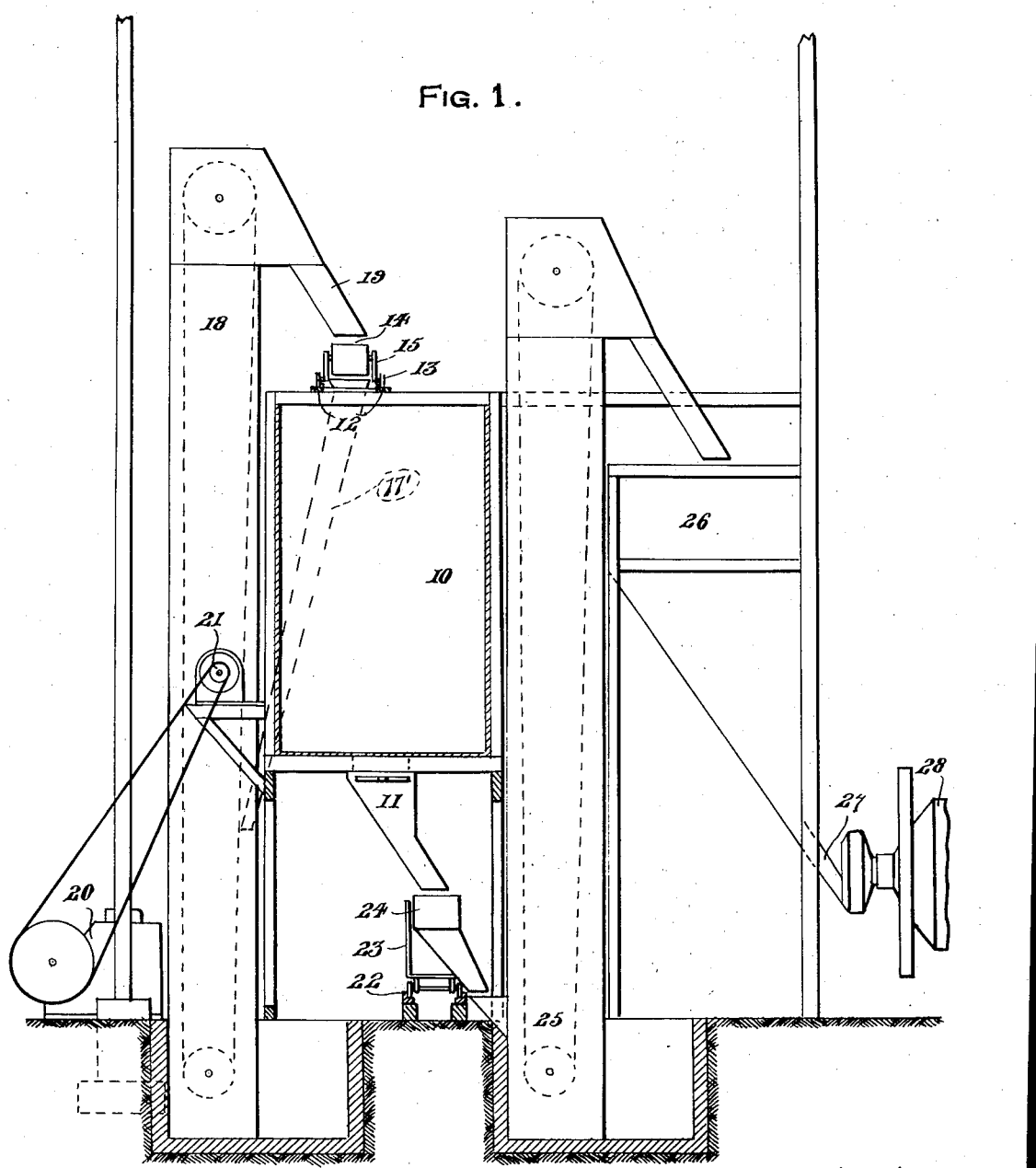

April 19, 1932. C. H. PEDDRICK, JR., ET AL 1,855,115
PROCESS FOR THE PREPARATION OF FELDSPATHIC FLUX FOR PORCELAIN
Original Filed Nov. 28, 1925  3 Sheets-Sheet 1

Inventors
C. H. Peddrick, Jr.
P. W. Lewis

By F. H. Bryant
Attorney

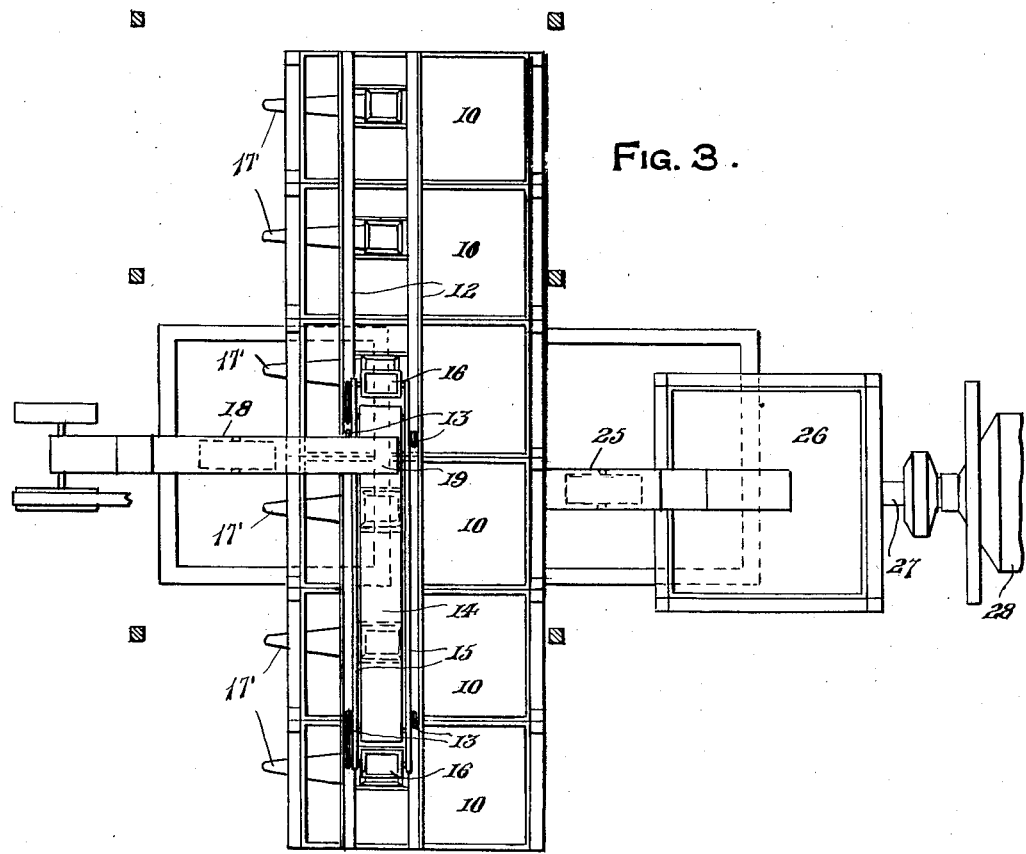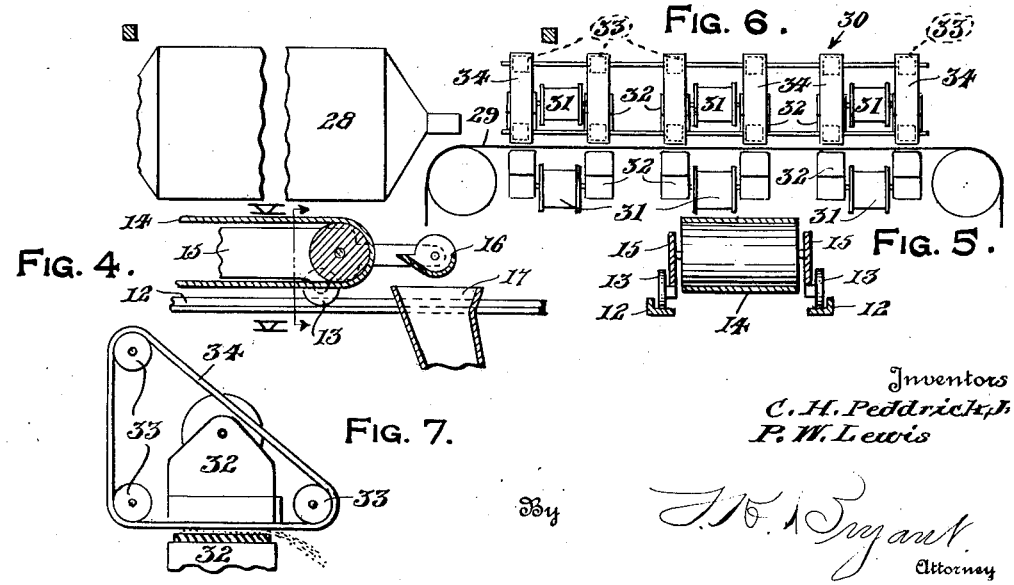

Patented Apr. 19, 1932

1,855,115

UNITED STATES PATENT OFFICE

CHARLES H. PEDDRICK, JR., OF GLOVERSVILLE, NEW YORK, AND PHILIP WAGER LEWIS, OF BALTIMORE, MARYLAND, ASSIGNORS TO UNITED FELDSPAR CORPORATION, OF NEW YORK, N. Y., A CORPORATION OF NEW YORK

PROCESS FOR THE PREPARATION OF FELDSPATHIC FLUX FOR PORCELAIN

Application filed November 28, 1925, Serial No. 71,962. Renewed December 22, 1931.

This invention relates to ceramic art, and has special reference to a process for the preparation of feldspathic flux for porcelain, glass, enamel, etc.

It is well known ("Non-Metallic Minerals" by Ladoo, 1925, pages 212–213) that theoretically pure feldspars are alumino silicates of potassium, sodium, calcium and rarely barium, and that such theoretically pure feldspars of any type are not found in commercial quantities. Feldspathic fluxes for porcelain, glass, enamel, etc., vary widely in their content of one or another kind of pure feldspar, or content of different kinds, and also in their content of quartz or silica, alkali, or other ingredient. The desires and necessities of users of feldspathic fluxes vary widely, and it is the object of this invention to enable feldspathic flux to be prepared at the mill of uniform, standard composition which can be repeated at will, instead of leaving the customer to buy, subject to acceptance or rejection, feldspars of specified grade, such as #1, #2, or #3, (Ladoo, page 220) but of unknown and varying composition, and make up his own flux with other materials after analyzing each shipment of each grade of feldspar he may have ordered.

Feldspar, which is a constituent of most of the flux used, is generally sold without any positive knowledge of its chemical contents, the rock being simply mined and crushed. Consequently, each consumer must mix with the feldspathic rock which they purchase additional quartz, alkali or pure feldspar, or such other ingredient as may be necessary, to give the proper mixture, and even under these circumstances there is no definite means of determining the proper proportions until the finished material is turned out of the kilns, this often resulting in a loss of the whole batch.

The present process provides for the preparation at the feldspar mill of a definite flux composition suitable for the requirements of the particular customer, and one which is ready to be used by the consumer without the addition of quartz, alkali or pure feldspar, or any other ingredient, to bring the flux up to the desired chemical content. The various industries manufacturing ware for different purposes use different proportions in the flux, and a second important object of the invention is to provide, at the mill, for the preparation by our improved process a flux suitable for the requirements of various purposes.

Figure 2:
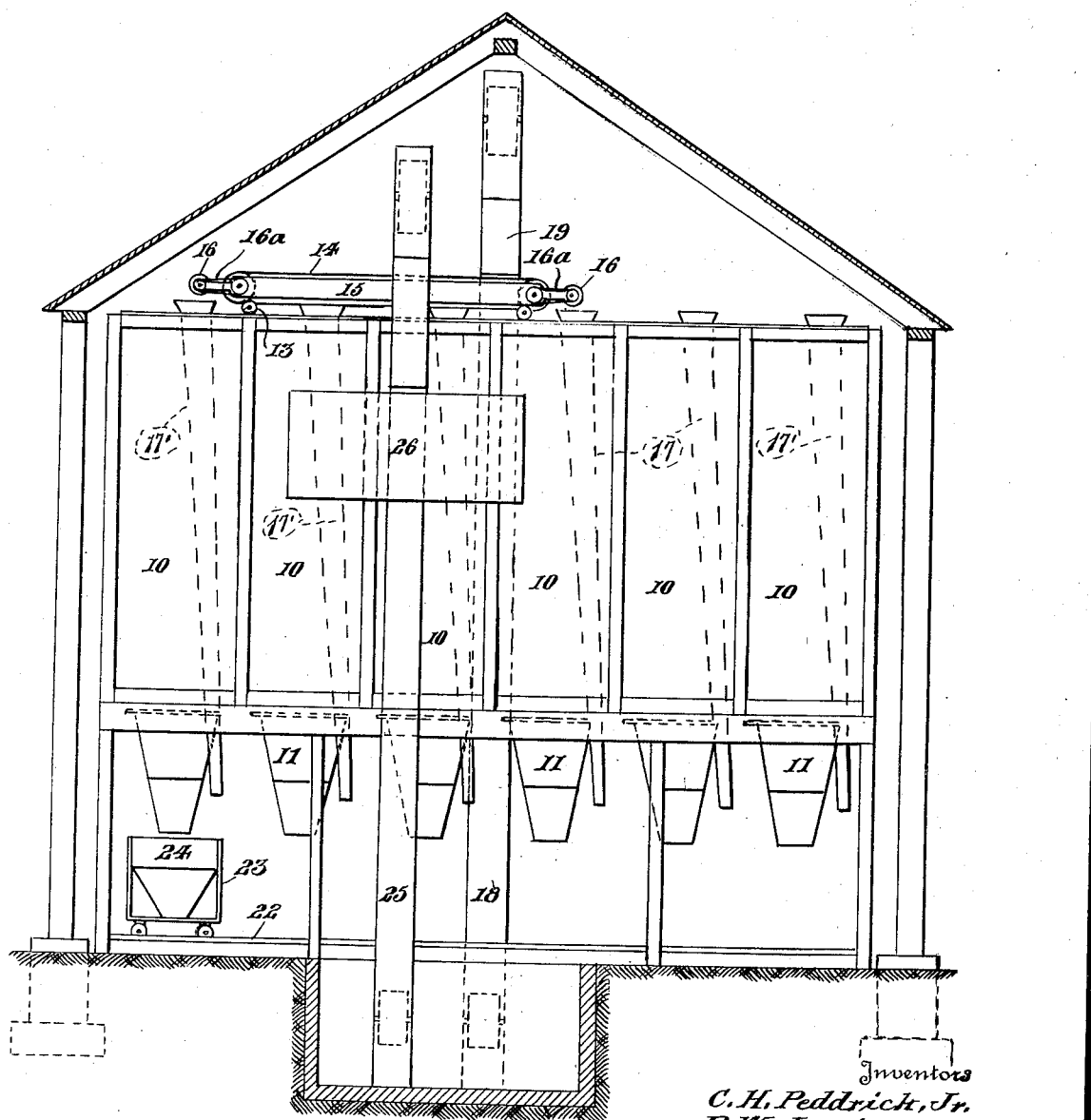

In the accompanying drawings like characters of reference indicate like parts in the several views, and:

Figure 1 is a transverse section through a row of bins and showing the apparatus connected therewith for our improved method of preparing the flux, Figure 2 is a front elevation of such apparatus, Figure 3 is a plan view thereof, Figure 4 is a detail view through a conveyor shown herewith and showing the sampling device, Figure 5 is a section on the line V—V of Fig. 4, Figure 6 is a side elevational view of a high intensity magnetic separator which forms a part of the apparatus, and Figure 7 is a vertical sectional view of the separator shown in Figure 6.

In carrying out the invention herein disclosed there is provided a series of bins which are indicated at 10, arranged side by side to have the delivery spouts 11 at their bottom ends. Extending along the tops of these bins longitudinally of the series is a trackway 12 whereon is supported by means of the wheels 13, a reversibly traveling conveyor 14 which is here shown as of the endless belt type. At each end of this conveyor between the side frames 15 is hung a receiving pan 16 adapted to empty into a suitable spout 17 positioned beneath the receiving pan. The receiving pans 16 are driven by the connections 16a leading from the supporting pulleys for the belt conveyor 14. During the operation of the conveyor, the pan at the end of the conveyor or toward which material is being moved is repeatedly filled with samples of the material, which samples are carried through the bin 10 receiving the material, by the proper spout 17, and deposited below the said bin into a suitable recep' ', not shown. At the back of the row of bins, and preferably disposed centrally thereof is an elevator 18 having a delivery spout 19 at its upper end to deliver material to the conveyor 14. Adjacent to the lower end of this elevator 18 is a rock crusher 20 driven from a suitable motor 21.

Extending longitudinally of the series of bins but arranged beneath them is a second trackway 22 whereon travels a scale 23 carrying a weighing hopper 24 into which the spouts 11 selectively deliver. This hopper 24 in turn delivers to an elevator 25 which conveys material up to the top of a large storage bin 26 having a delivery nozzle or spout 27 leading to a pulverizer 28.

The material discharged from the pulverizer 28 is deposited onto a conveyor belt 29, see Fig. 6. The conveyor feeds the material between the poles of a high intensity magnetic separator system, designated in its entirety by the reference character 30.

This magnetic system is employed for removing the mica particles from the feldspar. This statement would appear to be erroneous for mica is generally known as a dielectric and non-magnetic material, however, it has been discovered that the mica in a great many feldspar mines, or deposits, has a metallic mineral, such as iron, adhering to it and is known as black mica, biotite, or iron mica which is, to some extent, magnetic and can be removed as stated.

As shown in the drawings, the magnet system includes a plurality of pairs of upper and lower, opposed horseshoe electromagnets 31 which have their alined poles 32 arranged on opposite sides of the conveyor belt 29. In vertical alinement with each set of alined poles are three pulleys 33 which are all located above the plane of the upper side of the belt. Traveling upon each set of three pulleys is a cross belt 34 which is carried between the face of the upper pole and the material. Due to the high magnetic concentration on the upper pole, caused by the converging field, the magnetic force of the upper pole supersedes that of the lower, so that as the conveyor belt passes between the poles of the magnets, the magnetic particles are strongly attracted toward the upper pole and jump toward it. They are intercepted, however, and prevented from reaching the upper pole by the cross belt which removes them quickly from the field and influence of the magnets and casts them to one side, as shown in Fig. 7, where they may be caught by any suitable receptacle, not shown.

In the mining of feldspar certain parts of the mine give rock which differs in feldspar content and kind from that in other parts of the mine, or in other mines. Some is deficient in feldspar of one or another kind, or other ingredient. Other is deficient in quartz, alkali or other ingredient.

In the operation of our process the rock from a certain mine or from a given part of the mine is loaded into the crusher 20 and there crushed. From thence it passes onto the elevator 18 and onto the conveyor 15 which has been so positioned as to deliver the rock to a specific bin 10. Thus when such a bin has been filled, or when rock is brought from other parts of the mine, or from other mines, the conveyor is shifted so as to deliver to another bin. In each instance, a rock from a certain mine or from a part of the mine is kept in a different bin or bins as the case may be. In addition to above referred to bins of rock, one of the bins 10 is preferably stored with pure quartz, or alkali in suitable form while another bin may be filled with pure feldspar or other ingredients. When it is desired to make any certain mixture, the samples which are collected in the pans 17 during the delivery of the rock to the respective bins are analyzed, and by proper calculation a definite weight of rock from one of the bins is fed to the hopper 24, and this may be followed by rock from some other of the bins of mined rock, while, if desired, a pure feldspar or pure quartz or other ingredient, such as alkali, may be mixed with the contents of the hopper 24.

Then the hopper is moved to discharge to the conveyor 25 which feeds to the bin 26 so that the materials may run down to the pulverizer 28 where they are thoroughly pulverized, and during the pulverizing operation are mixed so that the product from the pulverizer is of known composition as regards its feldspar, quartz, alkali and other contents, and consequently is adapted in its content for the specific purposes desired.

Thus the product of the mill is, by the use of this process, standardized, and the purchaser is enabled to obtain the flux which is definitely proportioned for his particular purpose so that he is prevented from losses due to improperly proportioned flux.

By this invention a simple and efficient process is provided whereby the diverse feldspars occurring either in the same or different mines can be compounded at the mill into feldspathic flux of desired composition, and whereby such flux can be duplicated or modified as desired.

Having thus described the invention, what is claimed as new, is:

1. The process of producing feldspathic flux for porcelain, glass and so forth consisting in separately crushing different batches of feldspathic rock containing mica, delivering the crushed rock to different points of storage according to the source, analyzing a sample of each of the separately stored crushed rocks, combining predetermined quantities of the crushed rock from any selected points of storage with the necessary quantity and kind of material in which said rock is deficient in accordance with the results of such analyses, pulverizing and mixing the combined crushed rock and material, and then removing the mica particles from the pulverized mixture.

2. The process of producing feldspathic flux for porcelain, glass and so forth consisting in separately crushing different batches of feldspathic rock, delivering the crushed rock to different points of storage according to the source in the mine, analyzing a sample of each of the separately stored crushed rocks, combining predetermined quantities of the crushed rock from any selected point of storage with the necessary quantity and kind of material in which said rock is deficient in accordance with the results of such analyses, and then pulverizing and mixing the combined crushed rock and material.

3. The process of producing feldspathic flux of specified composition, consisting in mining feldspathic rock of different grades, crushing and storing same in separate bins according to the grade, separately analyzing each grade, combining calculated quantities of the several grades of crushed rock from selected points of storage as determined by the grades analyses to produce the desired flux composition, and combining the calculated quantities.

4. The process of producing feldspathic flux of specified composition, consisting in mining feldspathic rock of differing grades, crushing and storing such rock in separate bins according to the grade, sampling each grade as stored, separately analyzing each sample, combining calculated quantities of the several grades of crushed rock from selected points of storage as determined by the samples analyses with calculated quantities of other materials, to produce the desired flux composition, and mixing and pulverizing the combined calculated quantities.

In testimony whereof we affix our signatures.

CHARLES H. PEDDRICK, JR.
PHILIP WAGER LEWIS.